(12) United States Patent
Wada

(10) Patent No.: US 11,258,882 B2
(45) Date of Patent: *Feb. 22, 2022

(54) INFORMATION PROCESSING DEVICE, METHOD, AND STORAGE MEDIUM FOR PRIORITIZED CONTENT ACQUISITION

(71) Applicant: CANON KABUSHIKI KAISHA, Tokyo (JP)

(72) Inventor: Katsuhiro Wada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/788,464

(22) Filed: Feb. 12, 2020

(65) Prior Publication Data
US 2020/0252483 A1    Aug. 6, 2020

Related U.S. Application Data

(62) Division of application No. 14/115,551, filed as application No. PCT/JP2013/004282 on Jul. 11, 2013, now Pat. No. 10,601,958.

(30) Foreign Application Priority Data

Jul. 18, 2012 (JP) ................................. 2012-159904

(51) Int. Cl.
*H04L 29/08* (2006.01)
*H04L 12/851* (2013.01)
(Continued)

(52) U.S. Cl.
CPC .......... *H04L 67/42* (2013.01); *G06F 16/9574* (2019.01); *H04L 47/2408* (2013.01);
(Continued)

(58) Field of Classification Search
CPC ............. H04L 47/00–829; H04L 67/02; H04L 67/0242–2857; H04L 67/32–327; H04N 21/433–4331; G06F 16/957–9577
See application file for complete search history.

(56) References Cited

U.S. PATENT DOCUMENTS 5,991,302 A * 11/1999 Berl ........................ H04L 47/10
370/389
6,085,193 A *  7/2000 Malkin ................ G06F 16/9574
(Continued)

FOREIGN PATENT DOCUMENTS

EP           1650931       4/2006
JP       2000-222296 A     8/2000
(Continued)

OTHER PUBLICATIONS

Belshe, Mike, et al. "SPDY protocol." IETF draft, draft-ietf-httpbishttp2-00 (2012).*
(Continued)

*Primary Examiner* — David R Lazaro
*Assistant Examiner* — Julian Chang
(74) *Attorney, Agent, or Firm* — Venable LLP

(57) ABSTRACT

A server computer sets a priority order of each of contents based on an attribute of each of the contents designated by HTML data and provides the HTML data including the priority order with a client computer. The client computer acquires the contents from the server computer by using streams with priorities depending on the priority order of each of the contents designated by the HTML data provided from the server computer. The client computer controls display using a part of the contents and caches other contents from among the acquired contents.

11 Claims, 11 Drawing Sheets

(51) Int. Cl.
  *G06F 16/957*     (2019.01)
  *H04L 67/01*      (2022.01)
  *H04L 67/02*      (2022.01)
  *H04L 67/289*     (2022.01)
  *H04L 67/61*      (2022.01)
  *H04L 67/568*     (2022.01)
  *H04L 47/2408*    (2022.01)

(52) U.S. Cl.
  CPC ............ *H04L 67/02* (2013.01); *H04L 67/289* (2013.01); *H04L 67/2842* (2013.01); *H04L 67/322* (2013.01)

(56) References Cited

U.S. PATENT DOCUMENTS

| | | | | |
|---|---|---|---|---|
| 6,085,226 | A * | 7/2000 | Horvitz | G06F 16/9574 709/203 |
| 6,119,235 | A * | 9/2000 | Vaid | H04L 41/0896 709/235 |
| 6,330,561 | B1 * | 12/2001 | Cohen | G06F 16/9574 707/754 |
| 6,341,309 | B1 * | 1/2002 | Vaid | H04L 1/1854 375/225 |
| 6,415,319 | B1 * | 7/2002 | Ambroziak | G06F 16/30 709/219 |
| 6,553,393 | B1 * | 4/2003 | Eilbott | G06F 40/151 715/207 |
| 6,738,803 | B1 * | 5/2004 | Dodrill | H04L 29/06 704/E15.045 |
| 6,868,444 | B1 * | 3/2005 | Kim | H04L 41/085 709/223 |
| 7,130,890 | B1 * | 10/2006 | Kumar | H04L 67/28 709/218 |
| 7,136,635 | B1 * | 11/2006 | Bharatia | H04L 65/1006 455/422.1 |
| 7,417,637 | B1 * | 8/2008 | Donham | G09G 5/001 345/506 |
| 7,437,364 | B1 * | 10/2008 | Fredricksen | G06F 16/9574 |
| 7,558,884 | B2 | 7/2009 | Fuller et al. | |
| 7,706,785 | B2 * | 4/2010 | Lei | H04M 3/53 455/414.4 |
| 7,721,294 | B2 | 5/2010 | Quinet et al. | |
| 7,941,538 | B2 * | 5/2011 | Murphy | H04L 67/2857 709/226 |
| 7,975,025 | B1 * | 7/2011 | Szabo | G06F 16/9574 709/218 |
| 7,996,554 | B1 * | 8/2011 | Venkatraman | H04W 72/1242 709/232 |
| 8,224,964 | B1 * | 7/2012 | Fredrickson | H04L 29/08729 709/227 |
| 8,239,578 | B2 * | 8/2012 | Denoual | H04L 67/2823 709/247 |
| 8,448,059 | B1 * | 5/2013 | Dodrill | H04L 67/02 715/205 |
| 8,458,357 | B2 | 6/2013 | Menchaca et al. | |
| 8,478,836 | B1 * | 7/2013 | Chang | H04L 67/2852 709/213 |
| 8,812,658 | B1 * | 8/2014 | Teeraparpwong | G06F 16/958 709/224 |
| 8,984,048 | B1 * | 3/2015 | Maniscalco | H04L 67/10 709/203 |
| 9,241,170 | B1 * | 1/2016 | Galligan | H04N 19/10 |
| 9,307,004 | B1 * | 4/2016 | Hayden | H04L 67/2838 |
| 2001/0043273 | A1 * | 11/2001 | Herrod | H04L 61/30 348/220.1 |
| 2002/0107968 | A1 * | 8/2002 | Horn | H04N 21/8456 709/230 |
| 2003/0079026 | A1 * | 4/2003 | Watanabe | H04L 65/4076 709/228 |
| 2003/0137522 | A1 * | 7/2003 | Kaasila | G06F 16/9577 345/619 |
| 2003/0235287 | A1 * | 12/2003 | Margolis | H04L 29/06027 379/265.01 |
| 2004/0015777 | A1 * | 1/2004 | Lei | G06F 16/957 715/234 |
| 2004/0105445 | A1 * | 6/2004 | Wyn-Harris | H04N 7/17318 370/395.21 |
| 2004/0255003 | A1 * | 12/2004 | Tecu | H04L 67/02 709/217 |
| 2005/0053046 | A1 * | 3/2005 | Wang | H04L 47/2408 370/338 |
| 2005/0138143 | A1 * | 6/2005 | Thompson | G06F 16/9574 709/218 |
| 2005/0154781 | A1 * | 7/2005 | Carlson | G06F 16/9574 709/203 |
| 2005/0240940 | A1 * | 10/2005 | Quinet | H04L 29/06 719/315 |
| 2005/0287991 | A1 * | 12/2005 | Shima | H04L 63/0492 455/411 |
| 2006/0069617 | A1 * | 3/2006 | Milener | G06F 16/9574 705/14.69 |
| 2006/0069618 | A1 * | 3/2006 | Milener | G06Q 30/0277 705/14.73 |
| 2006/0070012 | A1 * | 3/2006 | Milener | G06F 3/0482 715/822 |
| 2006/0074984 | A1 * | 4/2006 | Milener | G06F 16/955 |
| 2006/0101341 | A1 * | 5/2006 | Kelly | G06F 3/04812 715/738 |
| 2006/0101514 | A1 * | 5/2006 | Milener | H04L 67/2847 726/22 |
| 2006/0133418 | A1 * | 6/2006 | Anand | H04L 47/10 370/468 |
| 2006/0171353 | A1 * | 8/2006 | Nagata | H04L 1/1887 370/329 |
| 2006/0195507 | A1 * | 8/2006 | Baek | H04L 67/322 709/203 |
| 2006/0282536 | A1 * | 12/2006 | Popkin | G06Q 10/107 709/226 |
| 2007/0005768 | A1 * | 1/2007 | Won | H04L 67/16 709/225 |
| 2007/0011155 | A1 * | 1/2007 | Sarkar | G06F 16/38 |
| 2007/0016676 | A1 * | 1/2007 | Breuer | G06F 16/252 709/225 |
| 2007/0162753 | A1 * | 7/2007 | Nakano | H04L 9/0844 713/171 |
| 2007/0206497 | A1 * | 9/2007 | Plamondon | H04L 1/1887 370/231 |
| 2007/0206615 | A1 * | 9/2007 | Plamondon | H04L 47/2433 370/401 |
| 2007/0233895 | A1 * | 10/2007 | Ramachandran | H04N 7/147 709/238 |
| 2007/0283036 | A1 * | 12/2007 | Dey | H04L 43/106 709/233 |
| 2008/0016144 | A1 * | 1/2008 | Hyun | H04L 67/26 709/203 |
| 2008/0034035 | A1 * | 2/2008 | Dodrill | H04M 1/72561 709/203 |
| 2008/0144601 | A1 * | 6/2008 | Nurminen | H04L 69/14 370/350 |
| 2008/0155623 | A1 * | 6/2008 | Ota | H04N 21/4667 725/109 |
| 2008/0224906 | A1 * | 9/2008 | Plamondon | H04L 67/28 341/76 |
| 2008/0225715 | A1 * | 9/2008 | Plamondon | H04L 47/11 370/232 |
| 2008/0225721 | A1 * | 9/2008 | Plamondon | H04L 47/193 370/235 |
| 2008/0225728 | A1 * | 9/2008 | Plamondon | H04L 47/27 370/237 |
| 2008/0228772 | A1 * | 9/2008 | Plamondon | G06F 16/9574 |
| 2008/0228850 | A1 * | 9/2008 | Samuels | H04L 67/28 709/201 |
| 2008/0228864 | A1 * | 9/2008 | Plamondon | G06F 16/9574 709/203 |
| 2008/0228899 | A1 * | 9/2008 | Plamondon | H04L 67/2852 709/219 |
| 2008/0228938 | A1 * | 9/2008 | Plamondon | H04L 67/02 709/233 |

(56) References Cited

U.S. PATENT DOCUMENTS

| | | | |
|---|---|---|---|
| 2008/0229017 A1* | 9/2008 | Plamondon | H04L 67/2847 711/118 |
| 2008/0229020 A1* | 9/2008 | Plamondon | H04L 67/2847 711/122 |
| 2008/0229021 A1* | 9/2008 | Plamondon | H04L 67/2847 711/125 |
| 2008/0229023 A1* | 9/2008 | Plamondon | H04L 67/28 711/126 |
| 2008/0229024 A1* | 9/2008 | Plamondon | H04L 67/28 711/126 |
| 2008/0229025 A1* | 9/2008 | Plamondon | H04L 67/28 711/126 |
| 2009/0047967 A1* | 2/2009 | Zhu | H04L 51/14 455/445 |
| 2009/0181650 A1* | 7/2009 | Dicke | G09B 29/003 455/414.1 |
| 2010/0095021 A1* | 4/2010 | Samuels | H04L 47/70 709/235 |
| 2010/0121972 A1* | 5/2010 | Samuels | H04L 47/10 709/231 |
| 2010/0172343 A1* | 7/2010 | Crinon | H04M 7/123 370/352 |
| 2010/0217808 A1* | 8/2010 | Benninger | H04L 51/04 709/206 |
| 2010/0218223 A1* | 8/2010 | Simpson | H04N 21/47214 725/58 |
| 2010/0223261 A1* | 9/2010 | Sarkar | G06F 16/38 707/726 |
| 2010/0241694 A1* | 9/2010 | Jensen | H04L 69/24 709/203 |
| 2010/0250696 A1* | 9/2010 | Iwasaki | H04L 47/24 709/207 |
| 2010/0306855 A1* | 12/2010 | Suenaga | H04L 67/06 726/26 |
| 2010/0313250 A1* | 12/2010 | Chow | H04L 63/08 726/5 |
| 2010/0325245 A1* | 12/2010 | Sibillo | G06F 16/9535 709/219 |
| 2010/0325249 A1* | 12/2010 | Brunson | H04L 29/12122 709/221 |
| 2010/0332667 A1 | 12/2010 | Menchaca et al. | |
| 2011/0022812 A1* | 1/2011 | van der Linden | H04L 67/1097 711/163 |
| 2011/0213800 A1* | 9/2011 | Saros | G06Q 30/02 707/769 |
| 2011/0218897 A1* | 9/2011 | Cooper | G06Q 30/04 705/34 |
| 2011/0258532 A1* | 10/2011 | Ceze | G06F 16/9574 715/234 |
| 2011/0276699 A1* | 11/2011 | Pedersen | H04L 47/781 709/227 |
| 2011/0302279 A1* | 12/2011 | Gordon | H04L 67/104 709/219 |
| 2012/0039332 A1* | 2/2012 | Jackowski | H04L 47/2441 370/389 |
| 2012/0039337 A1* | 2/2012 | Jackowski | H04L 47/2441 370/392 |
| 2012/0042060 A1* | 2/2012 | Jackowski | H04L 47/2475 709/224 |
| 2012/0072611 A1* | 3/2012 | Kandekar | H04N 21/4331 709/231 |
| 2012/0124141 A1* | 5/2012 | Kroeger | H04L 51/16 709/206 |
| 2012/0124142 A1* | 5/2012 | Kroeger | H04L 51/16 709/206 |
| 2012/0230345 A1* | 9/2012 | Ovsiannikov | H04L 47/22 370/412 |
| 2013/0077486 A1* | 3/2013 | Keith | H04L 47/22 370/230.1 |
| 2013/0100819 A1* | 4/2013 | Anchan | H04W 48/20 370/241 |
| 2013/0103780 A1* | 4/2013 | Panther | H04L 67/325 709/213 |
| 2013/0103791 A1* | 4/2013 | Gottdenker | H04L 67/322 709/217 |
| 2013/0147820 A1* | 6/2013 | Kalai | G06F 16/29 345/522 |
| 2013/0191511 A1* | 7/2013 | Liu | H04L 65/80 709/219 |
| 2013/0254314 A1* | 9/2013 | Chow | G06F 16/957 709/206 |
| 2013/0281098 A1* | 10/2013 | Fujii | H04L 47/30 455/445 |
| 2013/0297749 A1* | 11/2013 | Zhang | H04L 67/02 709/219 |
| 2013/0297814 A1* | 11/2013 | Annamalaisami | H04L 69/26 709/230 |
| 2013/0339451 A1* | 12/2013 | Nyberg | H04M 3/567 709/204 |
| 2014/0052846 A1* | 2/2014 | Scherkus | H04N 21/6581 709/224 |
| 2014/0258379 A1* | 9/2014 | L'Heureux | H04L 67/42 709/203 |
| 2014/0337869 A1* | 11/2014 | Faulkner | H04N 21/2408 725/14 |
| 2015/0043387 A1* | 2/2015 | Mahdi | H04W 4/16 370/259 |
| 2016/0127251 A1* | 5/2016 | Ovsiannikov | H04L 47/22 370/415 |
| 2018/0069991 A1* | 3/2018 | Iwasawa | G11B 27/034 |

FOREIGN PATENT DOCUMENTS

| | | |
|---|---|---|
| JP | 2009-205440 A | 9/2009 |
| JP | 2010-278800 A | 12/2010 |
| JP | 2011-141867 A | 7/2011 |
| RU | 2263951 | 11/2005 |
| RU | 2377635 | 12/2009 |
| WO | 2010/013397 A1 | 2/2010 |
| WO | 2011/008515 A2 | 1/2011 |
| WO | WO-2015147354 A1 * 10/2015 ............. H04L 67/42 |

OTHER PUBLICATIONS

Counterpart Russian office action, Application No. 2014152794, dated Jun. 2, 2016.

Extended European Search Report—EP Application No. 13820650.3 dated Feb. 16, 2016.

* cited by examiner

Fig. 9

```
<html>
  <head>
    <link rel="prefetch" href="/images/photo.jpg">
    <link rel="next" href="2ndpage.html">
    <title>My Album</title>
  </head>
  <body>
    <img src="/logo.jpg">
    <img src="/photo.jpg">
  </body>
</html>
```

INFORMATION PROCESSING DEVICE, METHOD, AND STORAGE MEDIUM FOR PRIORITIZED CONTENT ACQUISITION

CROSS REFERENCE TO RELATED APPLICATION

The present application is a Divisional of U.S. patent application Publication Ser. No. 14/115,551, filed on Nov. 4, 2013, which is a national stage entry under 35 U.S.C. § 371 of International Application No. PCT/JP2013/004282 filed on Jul. 11, 2013, which claims the benefit of foreign priority under 35 U.S.C. § 119 of Japanese Application No. 2012-159904 filed on Jul. 18, 2012, the entire disclosures of which are all hereby incorporated by reference herein.

TECHNICAL FIELD

The present invention relates to a data communication control technique that performs high-speed data display without causing any trouble on foreground processing.

BACKGROUND ART

There has been proposed a device that performs background processing by pre-reading display data required for subsequent display in the background of foreground processing. Foreground processing is processing involving output to a user such as image display, voice output, or the like. Background processing is processing without involving output to a user and corresponds to processing, for example, for caching data acquired from the outside in a storage unit without outputting the data to a user.

Patent Literature 1 discloses a data display device that acquires display data such as a web page or the like which is to be displayed in the future with high probability by pre-reading the display data and writes the display data to a data storage unit when no electrical power is supplied to an image display unit or when a foreground job is not executed.

CITATION LIST

Patent Literature

Patent Literature 1: Japanese Patent Laid-Open No. 2011-141867

However, Patent Literature 1 does not assume the case where the data display device acquires a plurality of display data in a plurality of streams. In addition, Patent Literature 1 does not assume an environment in which a plurality of streams of which the priority order is set in a plurality of levels is present and is capable of simultaneous communication. Thus, in the technique disclosed in Patent Literature 1, the priority order of each stream included in a plurality of streams cannot be appropriately determined, which causes the following problems.

Assume that a server holds data A which is preferentially used for foreground processing by a client and data B which is used for background processing and of which the priority order is lower than the data A and the server transmits the data A and B to the client in different streams.

Assume that a stream for transmitting the data A is a stream A, a stream for transmitting the data B is a stream B, and the priority of the stream B is lower than that of the stream A.

Here, when the server transmits the data B upon transmission of the data A, transmission of the data A may be delayed due to transmission processing or transmission halt processing of the low-priority stream B corresponding to the data B. In other words, transmission of the data A to be originally delivered to the client may be delayed due to transmission of the data B.

Furthermore, when there is a plurality of data to be transmitted from a server to a client, the server may be unable to set the optimum priority of streams for each data due to the difference of data to be transmitted, the difference in network environment between the client and the server, or the like. Consequently, appropriate data transfer is not performed, and thus, foreground processing (displaying the data A) to be originally performed is delayed due to the presence of the data B used for background processing.

SUMMARY OF INVENTION

The present invention has been made to solve at least one of the above problems. It is an object of the present invention to provide a mechanism that provides a plurality of display data from a server to an information processing device in streams of which the optimum priority is set for each data. Consequently, the information processing device appropriately performs foreground processing, resulting in an improvement in data display speed.

According to an aspect of the present invention an information processing system is provided that includes a server that provides data described in a markup language; and an information processing device that performs display control in accordance with the provided data. The server includes setting means for setting a priority order of each of contents based on an attribute of each of the contents designated by the data; and providing means for providing the data including the set priority order with the information processing device. The information processing device includes acquiring means for acquiring contents from the server by using streams with priorities depending on the priority order of each of the contents designated by the data provided from the server; displaying means for controlling display using a part of the contents from among the acquired contents; and managing means for caching other contents from among the acquired contents.

According to the present invention, when there is a plurality of data to be transmitted from a server to a client, the server can set the optimum priority of streams for each data due to the difference of data to be transmitted, the difference in network environment between the client and the server, or the like. Thus, appropriate data transfer and appropriate foreground processing are performed, resulting in an improvement in data display speed.

Further features of the present invention will become apparent from the following description of exemplary embodiments with reference to the attached drawings.

BRIEF DESCRIPTION OF DRAWINGS

FIG. 9 is a diagram illustrating an example of reply data including priority order information.

DESCRIPTION OF EMBODIMENTS

As the premise of the following description of the present embodiment, the terms used herein and the communication protocol to be targeted in the present embodiment will be defined. An example of the communication protocol to be targeted in the present embodiment includes SPDY (registered trademark) protocol.

The term "socket" is used as a label for identifying and classifying a communication in a TCP layer. In many cases, in the TCP layer, the IP protocol is typically used as a lower layer. A socket includes a set of, for example, an IP address and a port number.

The term "TCP connection" means a communication path in the TCP layer. More specifically, the TCP connection is a set of a receiving-side socket and a transmission-side socket. The term "stream" refers to a logical channel in an upper communication protocol of interest. The term "frame" refers to the minimum unit of fragmented data block upon actual transmission of data.

Here, a description will be given of the communication protocol (hereinafter referred to as "target protocol") to be targeted in the present embodiment. Note that an intermediate protocol (TLS, SSL, or the like) for maintaining transparency with the target protocol may be present. The target protocol performs communication by transmitting/receiving data called "frame" on TCP connection.

Figure 3:
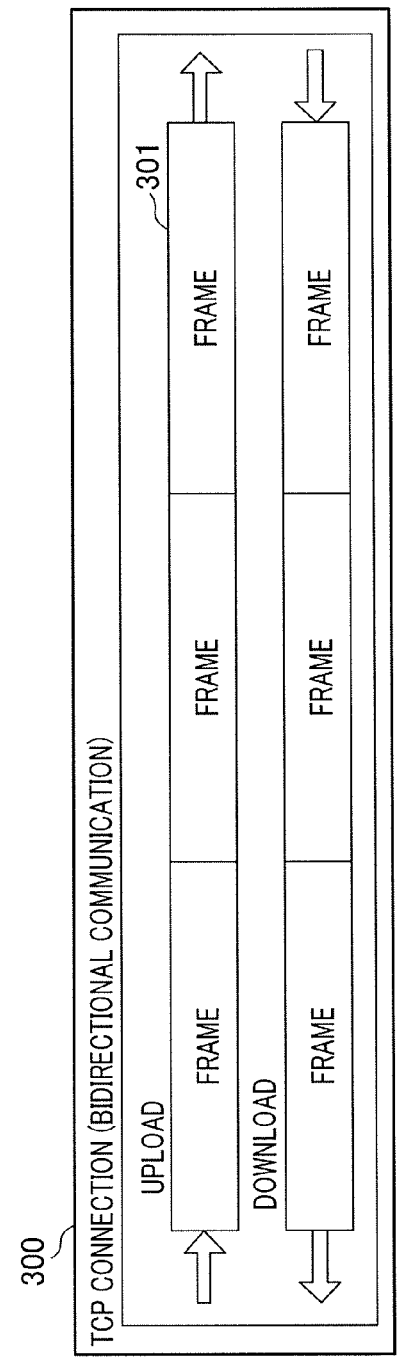
FIG. 3 is a diagram illustrating a frame to be transmitted on TCP connection.

FIG. 3 is a diagram illustrating a frame to be transmitted on TCP connection. A frame 301 is transmitted to a transmission destination on a TCP connection 300. The frame 301 has a frame size at its header.

Figure 4:
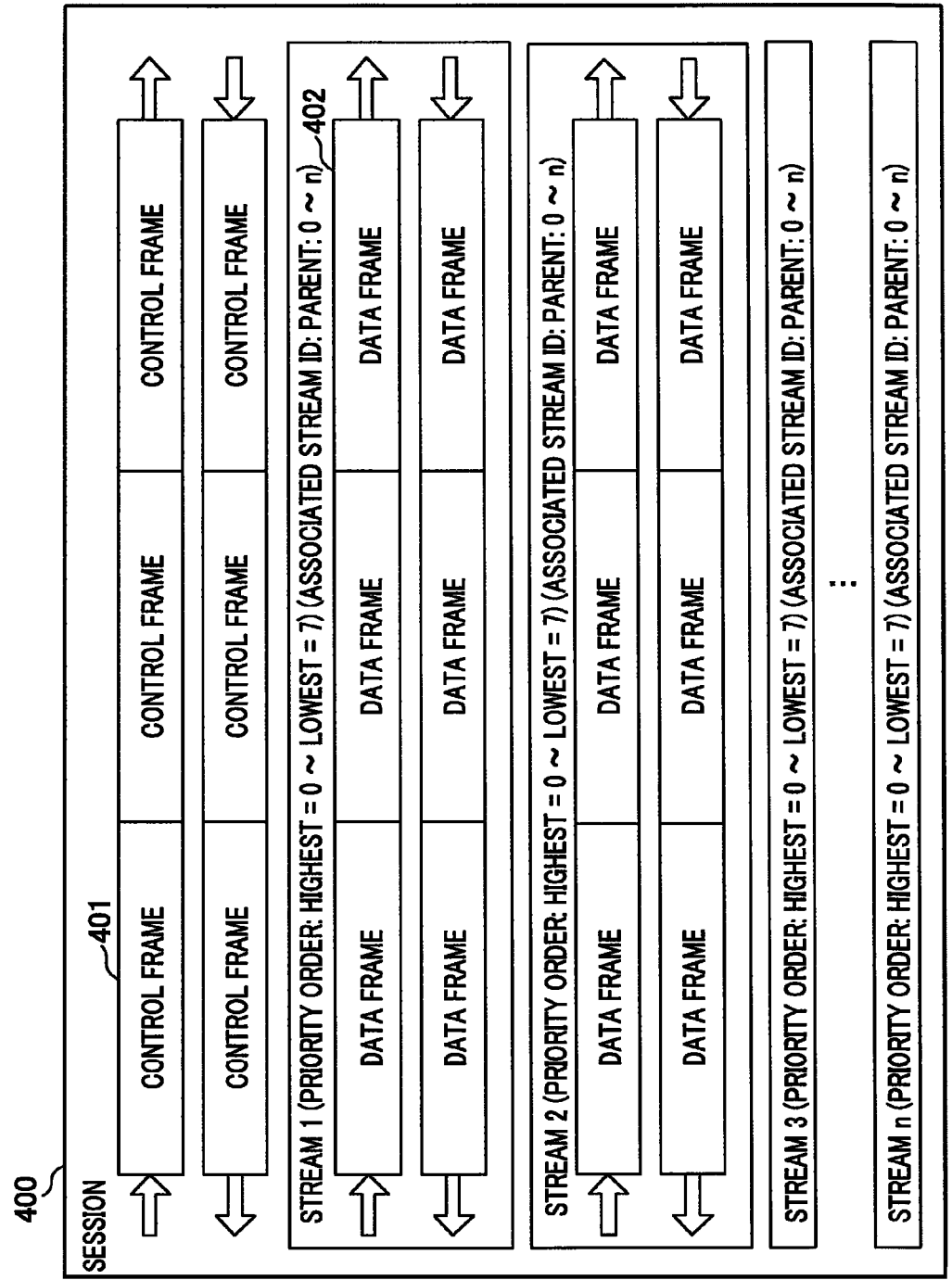
FIG. 4 is a diagram illustrating an exemplary data structure of a target protocol.

FIG. 4 is a diagram illustrating an exemplary data structure of a target protocol. The target protocol manages communication on one relevant TCP connection 300 as a session 400. One control frame 401 is present on one session 400. Communication relating to the session 400 is performed using the control frame 401.

The target protocol may hold any number of data streams 402 in addition to the control frame 401. In the present invention, the target protocol is not limited to a specific protocol. In the protocol having the structure shown in FIG. 4, the present invention is also applicable to a seventh layer (application layer), a sixth layer (presentation layer), a fifth layer (session layer), and the like in the OSI reference model. The terms "data stream" and "stream" are herein to be regarded as synonymous.

Actual data communication in an upper application and an upper protocol is performed using the data streams 402 shown in FIG. 4. Priority can be set to data streams 402. For the convenience of explanation, the number of priority levels of data streams is eight from "0" denoting the highest priority to "7" denoting the lowest priority but is not actually limited to eight. The number of priority levels may be any number.

In the present embodiment, a client computer 103 requests a server computer 102 to acquire objects. The client computer 103 sets priority to the data streams 402 in order to acquire the objects depending on the priority order set to the objects by the server computer 102. Each data stream has a stream ID for identification. For example, when the client computer 103 attempts to acquire an object having a high priority order, the stream 1 shown in FIG. 4 is used, whereas when the client computer 103 attempts to acquire an object having a low priority order, the stream 2 shown in FIG. 4 is used.

In the present embodiment, a dependency relationship can be defined between the data streams 402. When a data stream 402 has a parent stream, a dependency relationship can be expressed by setting the stream ID (Associated Stream ID shown in FIG. 4) of the parent stream to the data stream 402. When a data stream 402 has no parent stream, the stream ID of a parent stream is set to zero or no stream ID is set to a parent stream. By establishing a dependency relationship between data streams, a server can not only send data requested by a client as a reply but also push transmit data associated with data requested by a client. The target protocol described with reference to FIG. 4 performs communication between a server and a client on an equal basis without a master/slave relationship therebetween.

Next, a description will be given of a simple communication procedure of a target protocol. More specifically, a description will be given of a procedure from commencement of communication to end of communication after some data communication.

Firstly, assume that TCP connection has been established. At this time, a server and a client hold a bidirectional communication channel. Next, the data streams 402 are created using the control frame 401. The data streams 402 can be created from both the server side and the client side.

A description will be given by taking an example of processing for acquiring Web contents from a server to a client. In order to acquire the Web contents, the client needs to send a GET command in HTTP protocol to the server. Thus, the client makes a request for creating the data streams 402 using a content stream. When the server accepts the creation request, the server sends acceptance permission as a response through the control frame 401. The server sets the priority order of objects corresponding to the contents during the response. The client creates data streams of which the priority order and the dependency relationship are set based on the priority order. After creation of the data streams 402, the server and the client can make a GET request in HTTP protocol or send HTTP protocol as a reply using the created data streams 402.

After reception of data required for the client side from the server, the stream needs to be closed. At this time, the stream can be closed from both the client side and the server side. Then, either the server or the client who has received a stream end request makes a stream end request as soon as there is no data to be transmitted to thereby end the stream. For example, one-way communication can also be performed by intentionally not making an end request from the client side.

As an example of creating the data streams 402 from the server side, it is contemplated that the server which has received a GET request from the client side creates a new data stream 402 for dynamically pushing contents to the client. As can be seen from the example, the number of streams dynamically varies in accordance with time in communication in the target protocol.

Figure 1:
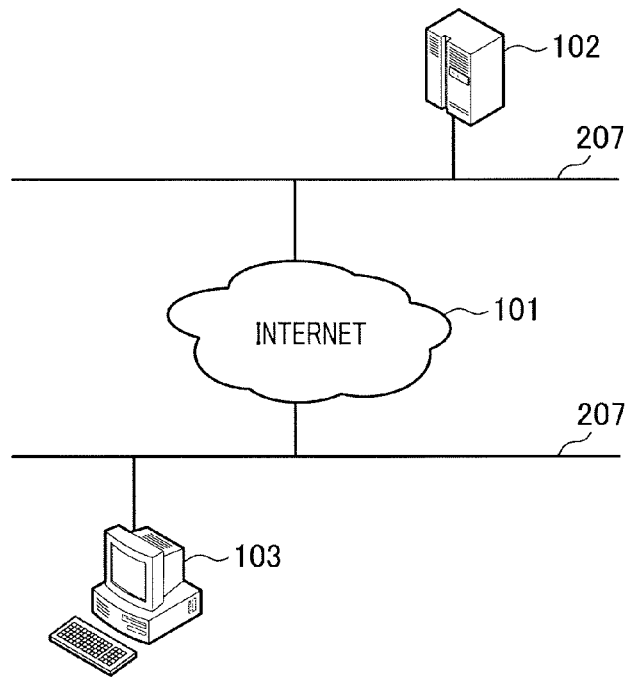
FIG. 1 is a diagram illustrating an exemplary system configuration of a system of the present embodiment.

FIG. 1 is a diagram illustrating an exemplary system configuration of a system of the present embodiment. The information processing system shown in FIG. 1 includes the client computer 103 and the server computer 102 which are connected to each other via a LAN 207 and Internet 101. The control method of the present embodiment is realized by the functions of the devices provided in the information processing system. The computer program of the present embodiment causes a computer to execute the control method. In order to realize the present invention, each of the client computer 103 and the server computer 102 includes a mechanism that manages the target protocol described with reference to FIG. 4. Hereinafter, a description will be given by taking an example in which the present invention is realized by the server computer 102 and the client computer 103. However, the present invention can also be realized by either one of the server computer 102 or the client computer 103.

The server computer 102 is a server that receives a content acquiring request from the client computer 103 and transmits objects included in the contents corresponding to the request to the client computer 103. Upon receiving a content acquiring request, the server computer 102 firstly sets the priority order of objects included in the corresponding contents and provides reply data including priority order information relating to the priority order of objects to the client computer 103.

Reply data is data that includes information for acquiring objects corresponding to a content acquiring request to the client computer 103. In this example, the server computer 102 provides data described in a markup language (e.g., HTML) as reply data to the client computer 103.

The client computer 103 is an information processing device that performs display control in accordance with data provided from the server computer 102. More specifically, the client computer 103 sets the various priorities of data streams, which are used for acquiring an object from the server computer 102, based on priority order information which is included in reply data provided from the server computer 102. The client computer 103 acquires desired contents by using the data streams of which the various priorities are set through acquisition of objects from the server computer 102. The client computer 103 controls display using a part of the contents and caches other contents from among the acquired contents. More specifically, the client computer 103 displays contents required for current display and caches other contents required for display subsequent to current display in a storage unit. An information processing device serving as the client computer 103 is a device including a program such as a web browser. Examples of the information processing device include devices such as a notebook PC, a tablet, a cellular phone, an image forming device such as a printer or a multi-function peripheral, or the like.

The LAN 207 is a communication line for exchanging information between the client computer 103 and the server computer 102. The Internet 101 is a communication line for exchanging information between the aforementioned devices across the firewall. With the aid of the Internet 101, the server computer 102 and the client computer 103 which belong to the LAN 207 can communicate with each other across the firewall. Each of the LAN 207 and the Internet 101 is a communication network for supporting, for example, TCP/IP protocol or the like and may be wired or wireless. Although the server computer 102 is illustrated as a single server in FIG. 1, the server computer 102 may also be configured by a plurality of server computers. The server computer 102 may also be configured as a virtual PC.

Unless otherwise specified, the present invention is of course applicable to both a single device and a system consisting of a plurality of devices as long as the function of the present invention can be executed. Unless otherwise specified, the present invention is of course applicable to a system that performs processing by establishing connection via a network (e.g., WAN) other than Internet as long as the function of the present invention can be executed.

Figure 2:
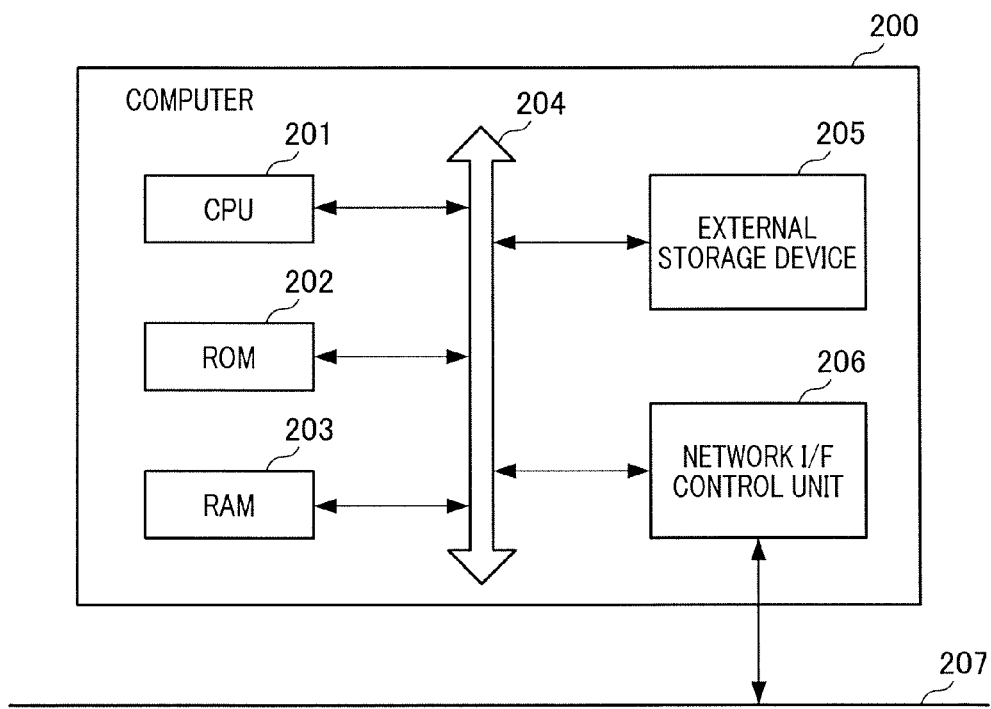
FIG. 2 is a diagram illustrating an exemplary hardware configuration of a client computer and a server computer.

FIG. 2 is a diagram illustrating an exemplary hardware configuration of a client computer and a server computer. A computer 200 shown in FIG. 2 corresponds to the client computer 103 or the server computer 102.

The computer 200 includes a CPU 201 that executes document processing including graphics, images, characters, tables (including table calculation or the like), and the like based on a program ROM provided in a ROM 202, a document processing program stored in an external storage device 205, or the like. The CPU 201 integrally controls the devices connected to a system bus 204. The computer 200 may include an input/output device.

The program ROM of the ROM 202 or the external storage device 205 stores an operation system or the like which is a control program of the CPU 201. Also, the data ROM of the ROM 202 or the external storage device 205 stores various data. A RAM 203 functions as a main memory, a work area, or the like of the CPU 201. A network I/F control unit 206 controls transmission/reception of data to/from the LAN 207.

Figure 5:
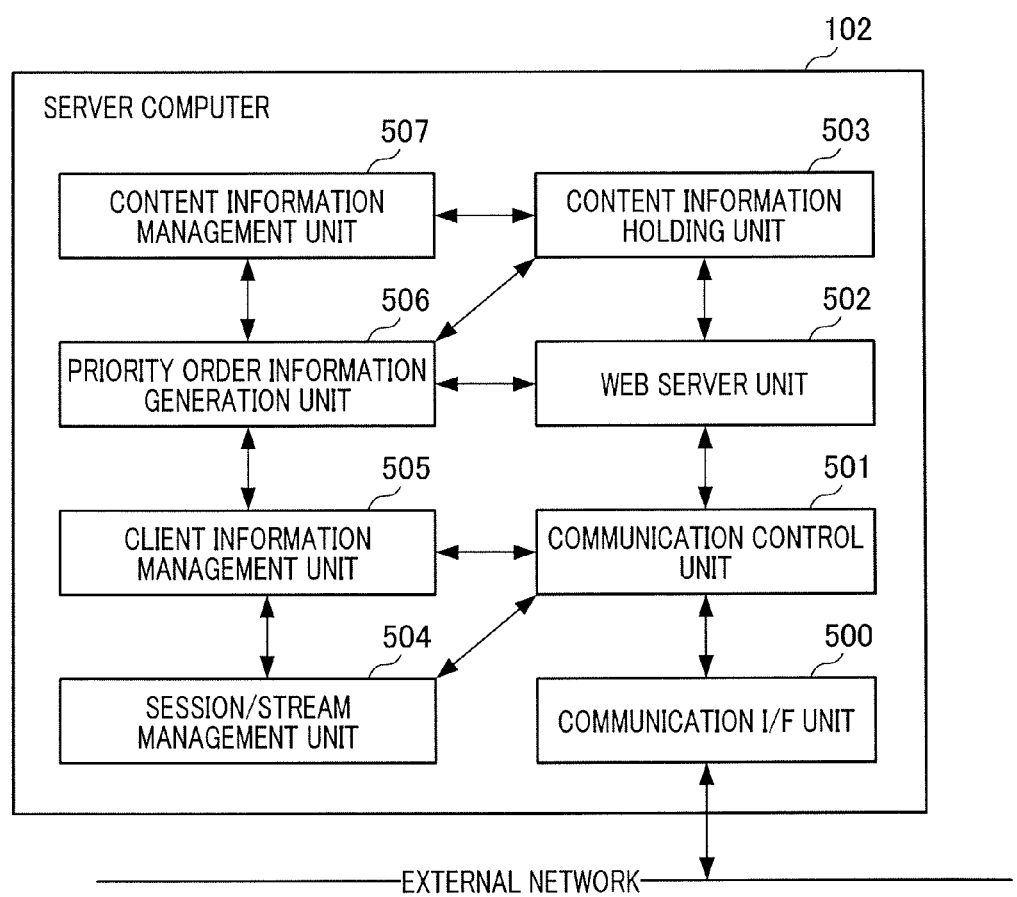
FIG. 5 is a diagram illustrating an exemplary software configuration of a server computer.

The software configuration of the server computer 102 shown in FIG. 5 and the processing of steps in the flowcharts shown in FIG. 7, FIG. 8, FIG. 10, and FIG. 12 are realized by executing processing by the CPU 201 based on the programs stored in the external storage device 205.

FIG. 5 is a diagram illustrating an exemplary software configuration of a server computer. The server computer 102 includes a communication I/F unit 500, a communication control unit 501, a Web server unit 502, a content information holding unit 503, and a session/stream management unit 504. The server computer 102 also includes a client information management unit 505, a priority order information generation unit 506, and a content information management unit 507.

The communication I/F unit 500 may be any as long as the communication I/F unit 500 satisfies RFC 793 (Transmission Control Protocol) which is a management mechanism for managing up to the TCP layer and provides available APIs. The communication I/F unit 500 provides an API for operating the TCP layer by an operating system.

The communication control unit 501 manages a target protocol, a SSL layer, and a TLS layer. The TCP is used as the target protocol. Although the target protocol does not need to use an SSL or TLS protocol, the target protocol often uses an SSL or TLS protocol due to problems related to security or firewall. An SSL or TLS protocol may be implemented in any method as long as implementation is compliant with the standard (RFC 2246 or RFC 4346).

The communication control unit 501 may also be an intermediate protocol other than an SSL or TLS protocol. More specifically, the communication control unit 501 provides an interface to the Web server unit 502 which is an upper layer application. Also, the communication control unit 501 manages transmission/reception of data via the communication I/F unit 500 serving as the lower layer. The communication control unit 501 does not perform all the processing of the target protocol but assigns the actual processing to the session/stream management unit 504.

The Web server unit 502 distributes display information about objects (HTML, scripts, images, style sheets, and the like) to the Web browser provided in the client computer 103 by the HTTP protocol. While, in the present embodiment, the server computer 102 includes the Web server unit 502, the server computer 102 can apply a Web service or other communication service other than a Web server in a communication system to which the target protocol is applicable.

Also, the Web server unit 502 sets priority order information generated by the priority order information generation unit 506 to reply data which is a reply to the client computer 103 serving as the transmission source of a content acquiring request, and then provides the resulting reply data to the client computer 103.

The content information holding unit 503 holds display information about objects (HTML, scripts, images, style sheets, and the like). The Web server unit 502 transmits an object held by the content information holding unit 503 to the Web browser of the client computer 103. A content which is requested to the server computer 102 by the client computer 103 includes a plurality of objects. Data to be transmitted from the Web server unit 502 to the Web browser of the client computer 103 also includes data to be dynamically generated by the Web server unit 502. Also, the Web server unit 502 may store a part of data in database such as an external storage device (not shown).

The session/stream management unit 504 manages information about a stream held by the session of the target protocol as management information. Management information includes a stream management ID, a stream priority, associated stream ID information associated with a stream, status information, transmission/reception buffer information, and the like as session associated information.

The client information management unit 505 manages client information which is environment information about the client computer 103. Client information includes information relating to a session held by the session/stream management unit 504 and a communication state of stream. Client information is used for generating priority order information to be described below. More specifically, client information includes the following acquired values which are obtained between the server computer 102 and the client computer 103 in the target protocol.

Upload Bandwidth
Download Bandwidth
Round Trip Time
Max Concurrent Streams•TCP CWND size
Download retrans rate
Initial window size The priority order information generation unit 506 generates priority order information based on client information managed by the client information management unit 505 or content information managed by the content information management unit 507. For example, the priority order information generation unit 506 determines the priority order of contents (objects) based on the attribute of the contents (objects) designated by reply data and then generates priority order information relating to the determined priority order. Priority order information is information about the priority order for acquiring objects, which correspond to the contents to be transmitted to the client computer 103 which has made a content acquiring request, from the server computer 102.

The content information management unit 507 manages content information. Content information is information relating to contents to be transmitted to the client computer 103. Content includes a plurality of objects. Examples of an object include a script, an image, a style sheet, or the like.

More specifically, content information includes at least the following items as content attributes:

Object size
Object type (script, style sheet, HTML, image, background image, or the like)
Object content such as hierarchy, domain, or the like (same page, next page, link destination, same domain, another domain)

Figure 6:
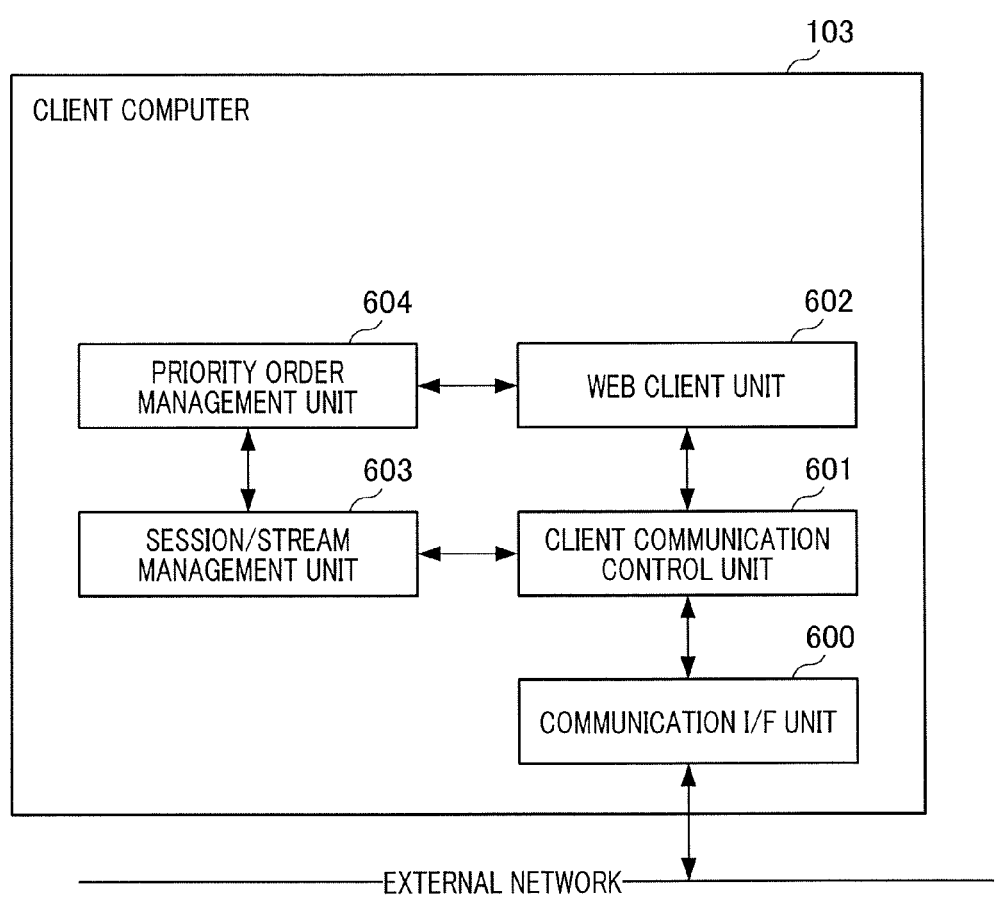
FIG. 6 is a diagram illustrating an exemplary software configuration of a client computer.

FIG. 6 is a diagram illustrating an exemplary software configuration of a client computer. A communication I/F unit 600 may be any as long as the communication I/F unit 600 satisfies RFC 793 (Transmission Control Protocol) which is a management mechanism for managing up to the TCP layer and provides available APIs. Also, the communication I/F unit 600 can perform communication control including another protocol. The communication I/F unit 600 provides an API for operating the TCP layer by an operating system.

A client communication control unit 601 manages a target protocol, a SSL layer, and a TLS layer. An SSL or TLS protocol may be implemented in any method as long as implementation is compliant with the standard (RFC 2246 or RFC 4346). The client communication control unit 601 may also be an intermediate protocol other than an SSL or TLS protocol. More specifically, the client communication control unit 601 provides an interface to a Web client unit 602 which is an upper layer application. Also, the client communication control unit 601 manages transmission/reception of data via the communication I/F unit 600 serving as the lower layer. The client communication control unit 601 does not perform all the processing of the target protocol but assigns the actual processing to a session/stream management unit 603.

The Web client unit 602 acquires display information about objects (HTML, scripts, images, style sheets, and the like) from the Web server unit 502 provided in the server computer 102 by the HTTP protocol. The Web client unit 602 includes a Web browser function. In a communication system to which the target protocol is applicable, the client computer 103 can also apply a Web service client or other communication service client application other than a Web service as the Web client unit 602.

The session/stream management unit 603 creates a session and a stream of the target protocol. Also, the session/stream management unit 603 manages information relating to the created stream as management information. Management information includes a stream management ID, a stream priority, associated stream ID information associated with a stream, status information, transmission/reception buffer information, and the like as session associated information.

A priority order management unit 604 determines the priority to be set to a stream for acquiring an object from the server computer 102 based on priority order information included in reply data received from the server computer 102 by the Web client unit 602. The Web client unit 602 causes the client communication control unit 601 to create a session and a stream having the determined priority and then acquires an object from the server computer 102 using the created session and stream.

More specifically, the Web client unit 602 acquires priority order information for each object, which is set to the HTML of reply data received from the Web server unit 502 of the server computer 102. Then, the priority order management unit 604 determines the appropriate priority of a stream based on the acquired priority order information. Then, the client communication control unit 601 creates a stream to which the determined priority is set for acquiring an object associated with the HTML of transmission data. Upon creation of a stream, the client communication control unit 601 associates a priority order for each object set by the server computer 102 with the priority of a stream for acquiring an object. In other words, the higher the priority order of an object, the higher priority a stream for acquiring the object is set.

Figure 7:
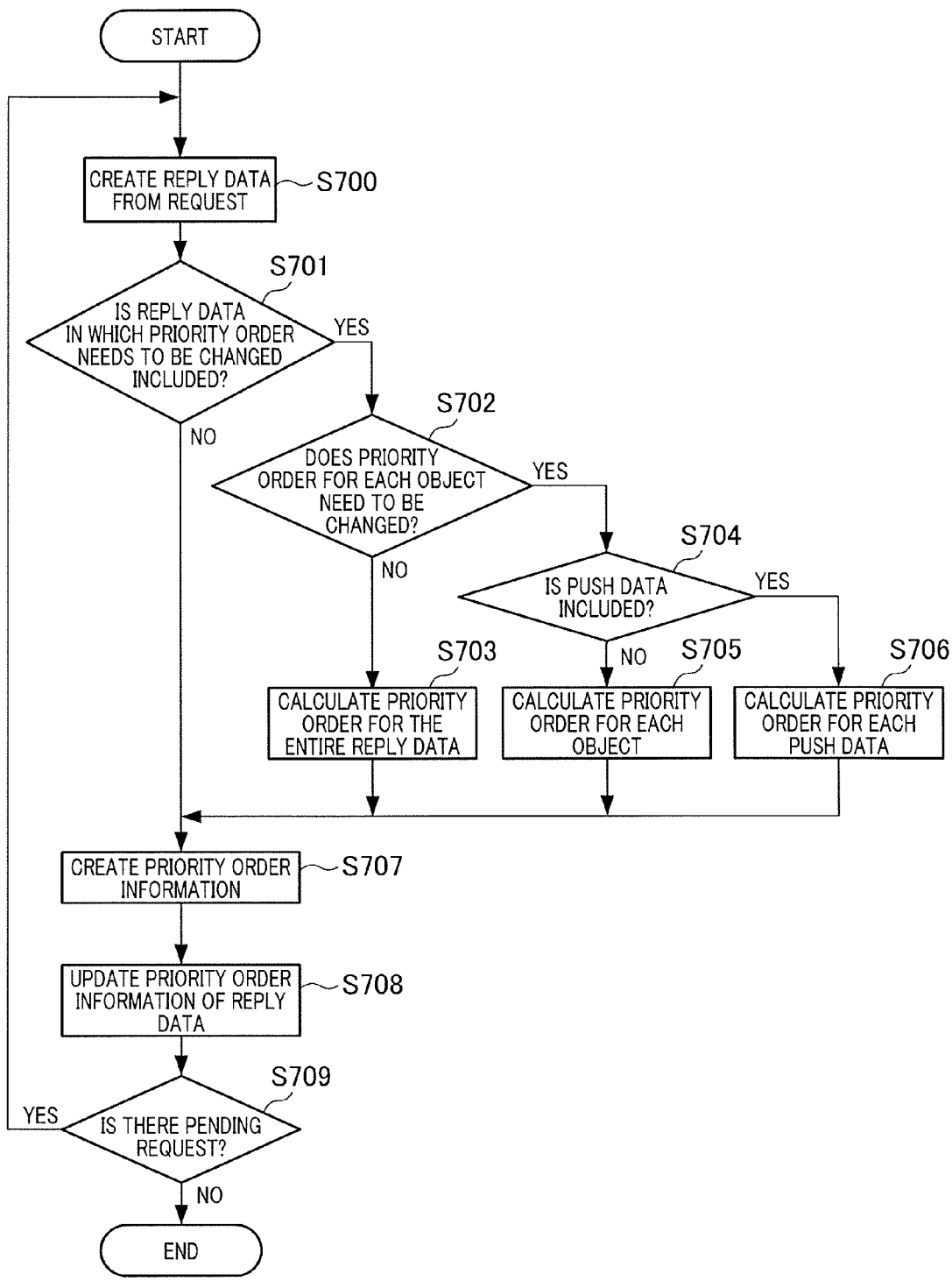
FIG. 7 is a diagram illustrating an example of operation processing performed by a server computer.

FIG. 7 is a diagram illustrating an example of operation processing performed by a server computer. In FIG. 7, a description will be given by taking an example of the flow of transmission/reception of data between the server computer 102 and the client computer 103 using the target protocol. When the Web server unit 502 of the server computer 102 receives a content acquiring request from the client computer 103, the Web server unit 502 creates reply data in accordance with the received content acquiring request (step S700). In this example, reply data is described in a markup language (e.g., HTML), and priority order information including default priority order for each object constituting the requested content is originally set in a tag included in reply data.

Next, the Web server unit 502 determines whether or not the priority order indicated by priority order information included in reply data needs to be changed based on content information managed by the content information management unit 507 (step S701). The Web server unit 502 determines whether or not the priority order needs to be changed based on, for example, any one criterion of the following conditions (1) to (4):

(1) whether or not an object size exceeds a specified value (threshold value),
(2) an object type (script, style sheet, HTML, image, background image, or the like),
(3) whether or not a link layer (same page, next page, link destination) exceeds a specified value, and
(4) whether or not a domain (same domain, another domain) is included in a specified value.

For example, when there is an object having a large size, the priority order of the object must be set to high. The Web server unit 502 sets a first priority order to an object of which the size is equal to or greater than a threshold value and sets a second priority order lower than the first priority order to an object of which the size is less than a threshold value. Thus, when there is an object having a size exceeding, for example, a threshold value, the Web server unit 502 determines that the priority order needs to be changed.

When the object is, for example, HTML, the Web server unit 502 changes the priority order of the HTML object to high priority order in order to cause the client computer 103 to quickly acquire the HTML object. When the object is an image, the Web server unit 502 may set the priority order to low. Also, the Web server unit 502 may set the priority order of an object of a high importance such as a logo image or the like to high and set the priority order of an object of a low importance such as a thumbnail image to low. For example, when the link layer is a single layer, the priority order of an object to be pre-read may be set to high and may be set to low from the second layer and subsequent layers.

When the Web server unit 502 determines that there is no need to change the priority order, the Web server unit 502 remains default priority order information. In this case, the processes in steps S707 and S708 are omitted. When the Web server unit 502 determines that the priority order needs to be changed, the process advances to step S702. Then, the Web server unit 502 determines whether or not a priority order needs to be set for each object (step S702).

More specifically, the Web server unit 502 determines whether or not the priority order of objects included in the requested content is all the same. When the priority order of objects is all the same, the Web server unit 502 determines that there is no need to set a priority order for each object, and the process advances to step S703. Then, the priority order information generation unit 506 calculates a priority order, which is common to the entire objects included in reply data, based on content information managed by the content information management unit 507 (step S703), and the process advances to step S707.

When there is an object having a different priority order, the Web server unit 502 determines that a priority order needs to be set for each object, and the process advances to step S704. Next, the Web server unit 502 determines whether or not reply data includes Push data (step S704). Push data is data that is autonomously transmitted from the server computer 102 to the client computer 103. The reason why determination processing in step S704 is performed is because, when there is data for continuously pushing from the server computer 102 to the client computer 103, a dedicated stream needs to be created for maintaining connectivity of a stream.

When reply data includes Push data, the priority order information generation unit 506 determines a priority order for each Push data based on content information managed by the content information management unit 507 (step S706), and the process advances to step S707. When reply data does not include Push data, the priority order information generation unit 506 determines a priority order for each object based on content information managed by the content information management unit 507 (step S705), and the process advances to step S707.

In step S707, the Web server unit 502 creates priority order information to be set to reply data based on the priority order determined by the priority order information generation unit 506. Then, the Web server unit 502 updates the priority order information of reply data from a default value to the priority order information created in step S707 (step S708).

FIG. 9 is a diagram illustrating an example of reply data including priority order information. Information about an object to be processed in the foreground is set within <body>. Information about an object to be acquired by background processing is set in <link rel> tag. In other words, it means that the priority order of an object set within <body> is set to high and the priority order of an object set in <link rel> tag is set to low.

Referring back to FIG. 7, the Web server unit 502 determines whether or not there is a pending request (step S709). When there is no pending request, the process ends. For example, the Web server unit 502 performs session or stream end processing. When there is a pending request, the process returns to step S700.

By means of operation processing described with reference to FIG. 7, the server computer 102 can provide priority order information, by which the client computer 103 can create an optimum stream, by including it in reply data in HTML to the client computer 103.

Figure 8:
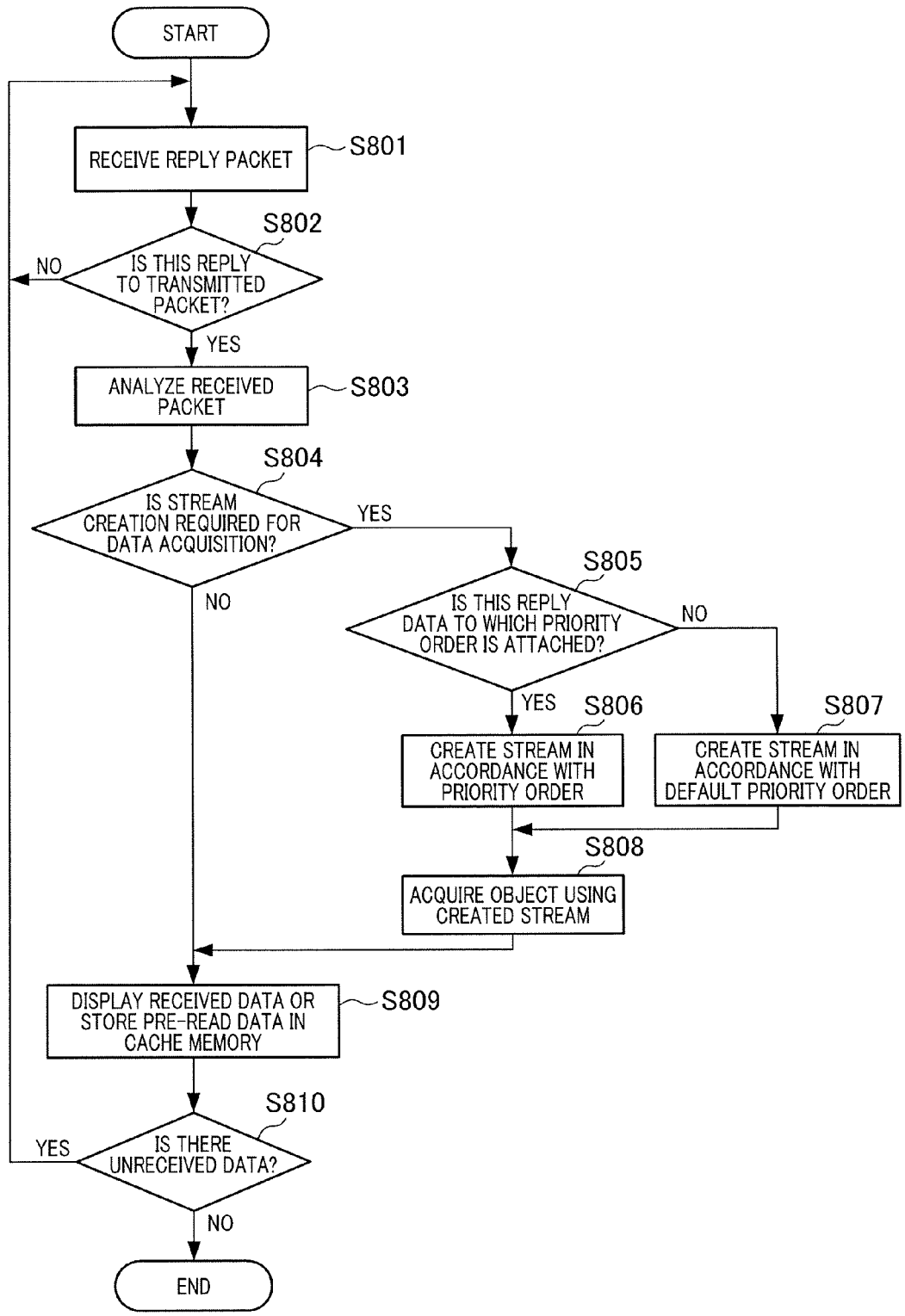
FIG. 8 is a diagram illustrating an example of operation processing performed by a client computer.

FIG. 8 is a diagram illustrating an example of operation processing performed by a client computer. Firstly, the Web client unit 602 receives reply data (step S801). In this example, it is assumed that reply data is HTML data. Next, the Web client unit 602 determines whether or not the received reply data is transmission data, that is, reply data corresponding to a content acquiring request to the server computer 102 (step S802). When reply data is not reply data corresponding to transmission data, reception processing continues. When reply data is reply data corresponding to transmission data, the Web client unit 602 analyzes reply data (step S803).

Next, the Web client unit 602 determines whether or not stream creation is required for data acquisition based on the analysis result in step S803 (step S804). More specifically, the Web client unit 602 determines whether or not an object to be acquired is required for creating a page based on information which is included in reply data and relates to the object. When the object is not required for creating a page, there is no need to acquire the object. Thus, in this case, the Web client unit 602 determines that stream creation is not required for data acquisition, and the process advances to step S809. When the object is required for creating a page, the Web client unit 602 determines that stream creation is required for data acquisition, and the process advances to step S805.

In step S805, the Web client unit 602 determines whether or not the priority order determined by the server computer 102 is set to reply data (step S805). When the priority order determined by the server computer 102 is not set to reply data, the process advances to step S807. Then, the Web client unit 602 creates a stream in which the default priority is set by the session/stream management unit 603 (step S807), and the process advances to step S808.

When the priority order determined by the server computer 102 is set to reply data, the Web client unit 602 creates a stream in which the priority corresponding to the priority order set to replay data is set via the session/stream management unit 603.

Hereinafter, a description will be given of stream generation based on the priority order set to reply data. It is assumed that the Web client unit 602 receives HTML data shown in FIG. 9 as reply data from the Web server unit 502.

The Web client unit 602 acquires priority order information for each object set in the <link rel> tag. The objects photo.jpg and 2ndpage.html which are designated by link rel="prefetch" and link rel="next", respectively, have low priority order. An object designated by link rel="prefetch" and link rel="next" is an object to be acquired by background processing. In other words, the object is an object to be acquired after acquisition of an object which has a normal priority order to be processed in the foreground and is indicated in <body>. The <link rel> tag in HTML according to the present embodiment is just an example and the present invention is not limited thereto.

The priority order management unit 604 determines the appropriate priority of a stream based on priority order information in HTML data. The Web client unit 602 instructs the client communication control unit 601 to create a stream for acquiring an object corresponding to HTML data. Upon creation of a stream, priority information in HTML data is associated with appropriate priority information about a stream.

In the example shown in FIG. 9, the priority order of each of photo.jpg and 2ndpage.html is lower than that of logo.jpg. Thus, upon acquiring photo.jpg and 2ndpage.html from a server, the Web client unit 602 designates the propriety of the data stream 402 upon creation as "7" which is the lowest priority.

For logo.jpg, the data stream 402 is created by designating the priority order of logo.jpg to the default value "4" or to the highest level "0". For the convenience of explanation, the number of priority levels of data streams is eight from "0" denoting the highest priority to "7" denoting the lowest priority but is not actually limited to eight. The number of priority levels may be any number. As described above, an object is acquired by using a data stream of which the priority is set in accordance with the priority order of the object designated by the server computer 102.

The present embodiment is preferably used in, for example, a Web mail system. When a mail list on a server is displayed on the Web browser of the client computer 103, the server computer 102 designates the link destination of an unread mail by link rel="next" in HTML.

The Web client unit 602 of the client computer 103 creates the data stream 402 used for acquiring a mail list for a main body (<Body>) by designating its priority order to the default value "4". In contrast, the Web client unit 602 creates the data stream 402 for acquiring the unread mail main body designated by link rel="next" from the server computer 102 by designating its priority order to low level "5". An unread mail having a predetermined size or greater including an attached file or the like is designated by link rel="prefetch" from the server computer 102. Thus, the Web client unit 602 acquires the data stream 402 for acquiring the unread mail by designating its priority order to level "6".

Referring back to FIG. 8, the Web client unit 602 receives the HTML object analyzed in step S803 from the server computer 102 using the stream created in step S806 or S807 (step S808).

Next, the Web client unit 602 displays the received data (object) (step S809). In step S809, the Web client unit 602 further stores the pre-read reply data acquired by the low priority stream in a cache memory. Data stored in a cache memory can be displayed at high-speed in accordance with a user's display instruction.

Next, the Web client unit 602 determines whether or not there is unreceived data for the HTML object analyzed in step S803 (step S810). When there is unreceived data, the process returns to step S801 and the Web client unit 602 receives unreceived data from the server computer 102. When there is no unreceived data, the process ends.

As described above, the client computer 103 can creates optimum streams for acquiring objects included in contents based on the priority order set by the server computer 102.

By the above description, when there is a plurality of data to be transmitted from the server computer 102 to the client computer 103, the server computer 102 can execute the following processing. The server computer 102 can set the optimum priority of streams used for acquiring an object based on the attribute of the object to be transmitted. Consequently, appropriate data transfer is performed by appropriate foreground processing, resulting in an improvement in data display speed.

Second Embodiment

In the second embodiment, the server computer 102 performs priority order control based on the communication state between the server computer 102 and the client computer 103.

Figure 10:
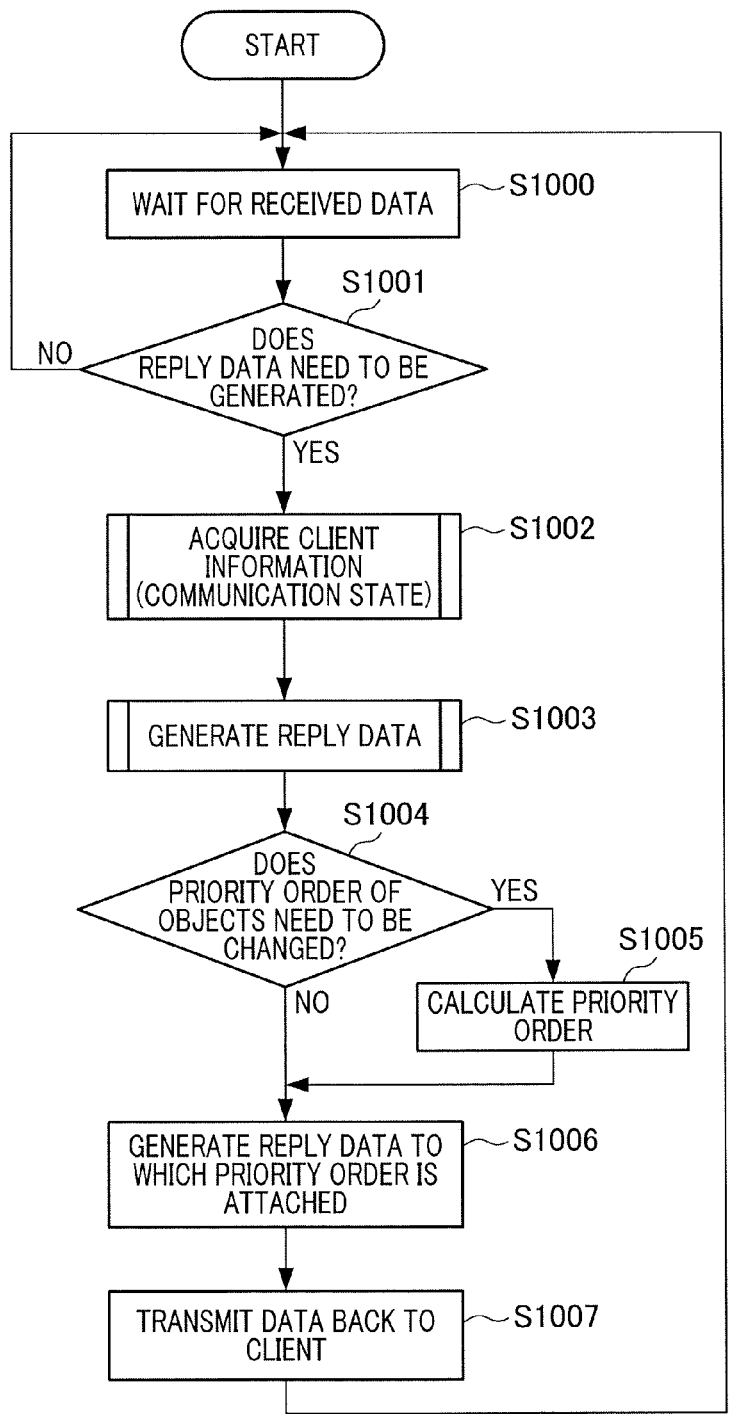
FIG. 10 is a diagram illustrating an example of operation processing performed by a server computer.

FIG. 10 is a flowchart illustrating an example of operation processing performed by a server computer according to the second embodiment. Firstly, the Web server unit 502 performs processing for waiting data received from the client computer 103 (step S1000). Next, the Web server unit 502 determines whether or not processing for generating reply data corresponding to received data is required (step S1001). When processing for generating reply data corresponding to received data is not required, the process returns to step S1000. When processing for generating reply data corresponding to received data is required, the process advances to step S1002.

Next, the Web server unit 502 acquires the communication state between the server computer 102 and the client computer 103 as client information from the client information management unit 505 (step S1002).

The client information management unit 505 manages information about a session and stream used in communication with the client computer 103 as client information. Information about a session and stream, which can be acquired upon communication, includes the following acquired values which are obtained between the server computer 102 and the client computer 103 in the target protocol.

Upload Bandwidth
Download Bandwidth
Round Trip Time
Max Concurrent Streams
TCP CWND size
Download retrans rate
Initial window size Next, the Web server unit 502 performs processing for generating reply data (step S1003). More specifically, the Web server unit 502 generates reply data to be returned to the client computer 103 based on the content information held by the content information holding unit 503.

Next, the Web server unit 502 determines whether or not the priority order of objects needs to be changed (step S1004). When the priority order of objects does not need to be changed, the process advances to step S1006, and the Web server unit 502 generates reply data in which the default priority order is set. The Web server unit 502 may also generate reply data without setting the priority order.

When the priority order of objects needs to be changed, the process advances to step S1006. Then, the Web server unit 502 generates priority order information based on the client information acquired in step S1002, (step S1005), and the process advances to step S1006. The Web server unit 502 generates reply data including the generated priority order information (step S1006). Then, the Web server unit 502 transmits the generated reply data back to the client computer 103 (step S1007).

Figure 11:
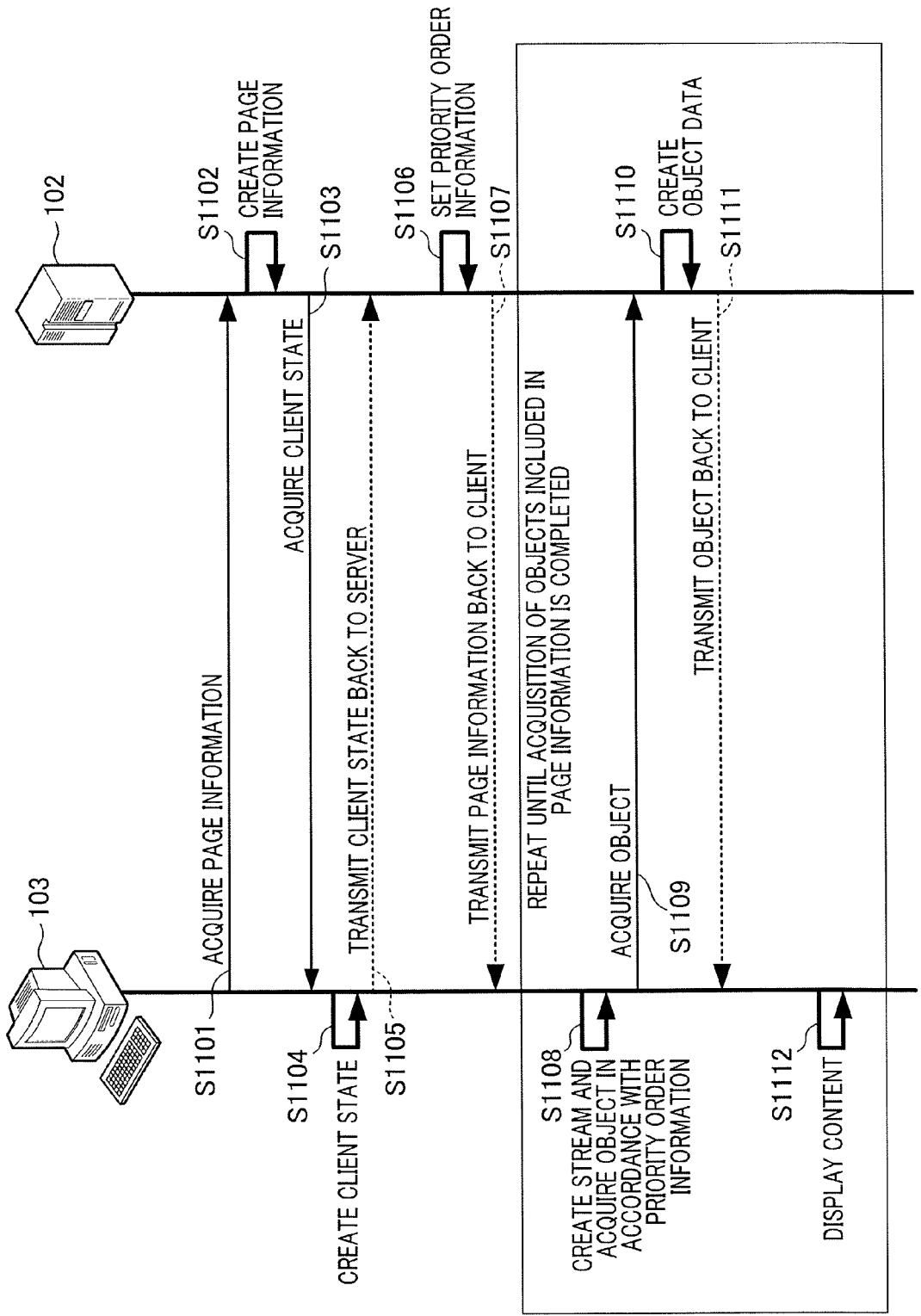
FIG. 11 is a diagram illustrating an example of communication processing between a server computer and a client computer.

FIG. 11 is a sequence diagram illustrating an example of communication processing between the server computer 102 and the client computer 103 according to the second embodiment. The client computer 103 performs page information acquisition to the server computer 102 (step S1101). For example, the client computer 103 executes the Get command of the target protocol by designating the URL of the server computer 102.

Next, the server computer 102 creates page information in HTML as Get command reply information for the designated URL (step S1102). Next, the server computer 102 makes a client information acquiring request, i.e., a request for acquiring a communication state between the server computer 102 and the client computer 103 (step S1103).

The session/stream management unit 603 of the client computer 103 creates client information indicating a communication state between the server computer 102 and the client computer 103 in response to the client information acquiring request (step S1104). Then, the client computer 103 transmits client information back to the server computer 102 (step S1105).

Among information indicating a communication state between the server computer 102 and the client computer 103, information which cannot be acquired by the client computer 103 is acquired by the server computer 102 itself. For example, a round trip time from the server computer 102 to the client computer 103 can be acquired as follows. The server computer 102 transmits a packet for round trip time measurement to the client computer 103 and receives a reply from the client computer 103 to thereby acquire a round trip time. The acquired client information is managed by the client information management unit 505.

Next, the priority order information generation unit 506 of the server computer 102 generates priority order information to be set to reply data to the client computer 103 based on client information (step S1106). When it is determined that the priority order does not need to be changed, the Web server unit 502 of the server computer 102 generates reply data with the default priority order or priority order information not attached thereto. When it is determined that the priority order needs to be changed, the Web server unit 502 generates reply data with priority order information attached thereto.

Next, the Web server unit 502 sends reply data as a reply to the client computer 103 (step S1107). In this example, the Web server unit 502 sends HTML of page information as a reply.

The Web client unit 602 of the client computer 103 repeats the following processing until acquisition of objects included in page information is completed. The Web client unit 602 creates a stream in the target protocol in accordance with the priority order information set in HTML of page information received from the server computer 102. Then, the Web client unit 602 makes an object acquiring request using the created stream (steps S1108 and S1109).

The Web server unit 502 of the server computer 102 creates object data corresponding to the object acquiring request from the client computer 103 (step S1110). Then, the Web server unit 502 sends object data as a reply to the client computer 103 (step S1111). In this manner, the Web client unit 602 of the client computer 103 acquires contents consisting of the returned object data. Then, the Web client unit 602 displays a content required for current display from among the acquired contents (step S1112). In step S1112, the Web client unit 602 further functions as a management unit that caches a content required for display subsequent to current display.

The present embodiment is preferably used in, for example, a Web mail system. Assume the case where a mail list is displayed on the server computer 102 from the web browser of the client computer 103. The server computer 102 acquires a round trip time (RTT) from the server computer 102 to the client computer 103.

The server computer 102 determines whether or not a communication environment between the server computer 102 and the client computer 103 is either a high-speed communication environment or a low-speed communication environment based on the acquired RTT. The server computer 102 reduces the number of contents of which the priority order is set low when the communication environment is a low-speed communication environment than the number of contents of which the priority order is set low when the communication environment is a high-speed communication environment. In this example, the server computer 102 performs priority order control for restricting the number of counts for pre-reading the unread mail main bodies depending on the value of RTT.

For example, when RTT is 3 seconds, the server computer 102 determines that a communication environment between the server computer 102 and the client computer 103 is a low-speed communication environment. Then, the server computer 102 restricts the number of counts for pre-reading the unread mail main bodies as "1" and designates only one item by link rel="next" in HTML. In this manner, the server computer 102 instructs the client computer 103 to pre-read one item.

When RTT is 100 milliseconds, the server computer 102 determines that a communication environment between the server computer 102 and the client computer 103 is a high-speed communication environment. Then, the server computer 102 designates the number of counts for pre-reading the unread mail main bodies as "10". More specifically, the server computer 102 designates the number of counts for pre-reading the unread mail main bodies as "10" using link rel="next" in HTML. In this manner, the server computer 102 instructs the client computer 103 to pre-read ten unread mail main bodies.

For a mail list which is a main body (<Body>), the client computer 103 designates the priority order "4" to a stream corresponding thereto. For the unread mail main body designated by link rel="next", the client computer 103 designates the low priority order "5" to a stream corresponding thereto. In this manner, after acquisition of a mail list which is a main body by foreground processing, the client computer 103 can acquire the unread mail main body by background processing and cache it in a cache memory.

In the present embodiment, although a description has been given of processing for setting a priority order based on an RTT, similar processing for setting a priority order can also be made based on other client information. For example, a priority order can also be made based on an upload/download bandwidth, a congestion window size, the number of bytes retransmitted/the number of bytes transmitted, an initial window size, or the like. The number of streams capable of being simultaneously used can also be limited based on the number of the maximum simultaneous connection streams. For example, when the number of streams which are capable of being simultaneously used by the client computer 103 is five, the number of streams for foreground processing and the number of streams for background processing can be determined as three and two, respectively.

According to the second embodiment, the server computer 102 can set the optimum priority of streams for each data based on the state of a network environment between the server computer 102 and the client computer 103. Thus, appropriate data transfer is performed by appropriate foreground processing, resulting in an improvement in data display speed.

Third Embodiment

In the third embodiment, the server computer 102 performs priority order control based on the attributes of objects and the communication state between the server computer 102 and the client computer 103.

Figure 12:
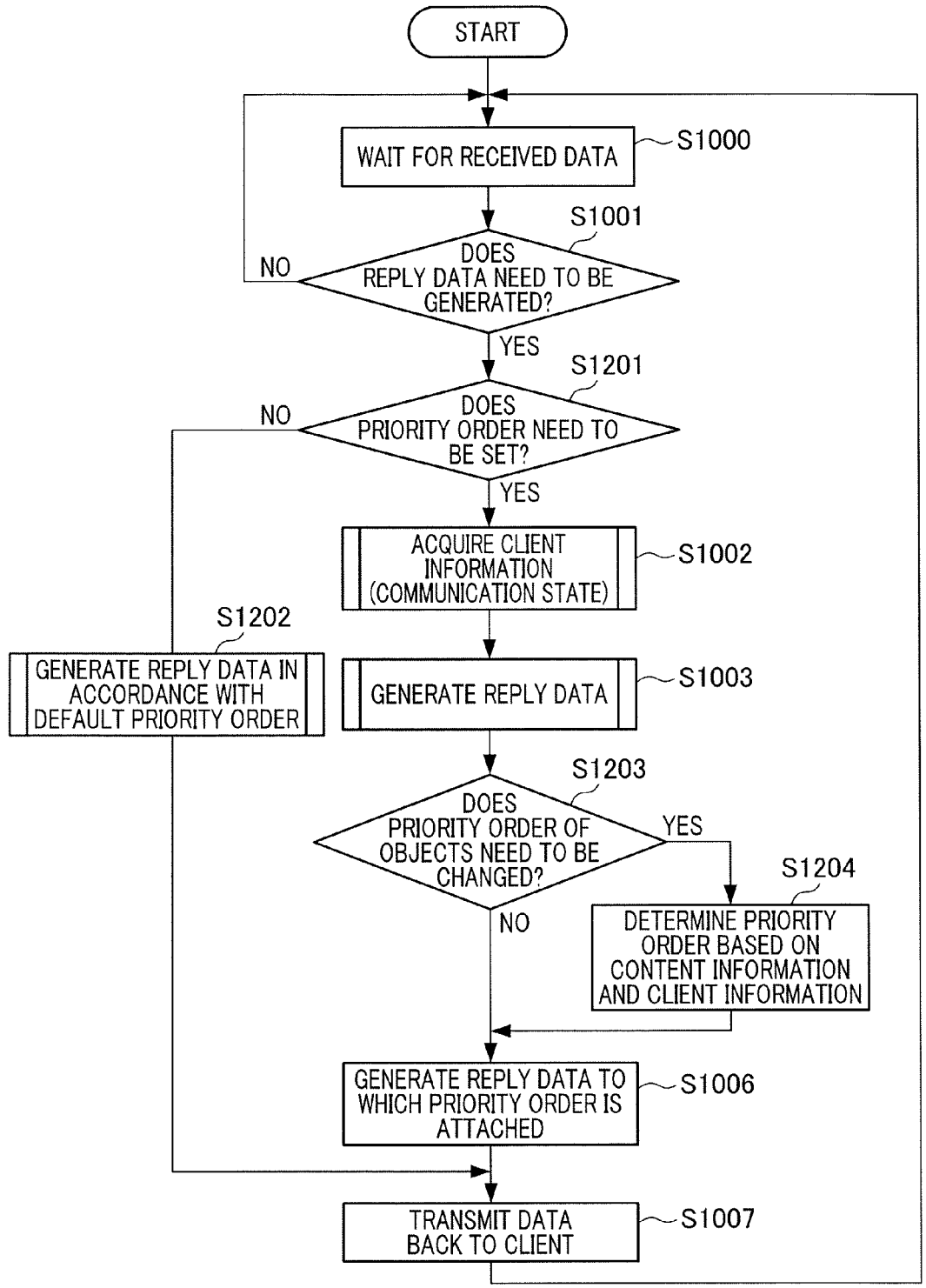
FIG. 12 is a diagram illustrating an example of operation processing performed by a server computer.

FIG. 12 is a flowchart illustrating an example of operation processing performed by a server computer according to the third embodiment. The processes in steps S1000, S1001, S1002, S1003, S1006, and S1007 are the same as those in steps S1000, S1001, S1002, S1003, S1006, and S1007 shown in FIG. 10.

In step S1201, the Web server unit 502 determines whether or not the priority order needs to be set (step S1201). More specifically, the Web server unit 502 determines whether or not reply data includes objects having a different priority order, which are indicated by <link rel="prefetch"> tag or <link rel="next"> tag, as default priority order information. When reply data includes objects having a different priority order, the Web server unit 502 determines that the priority order needs to be set, and the process advances to step S1002. When reply data does not include objects having a different priority order, the Web server unit 502 determines that the priority order does not need to be set, and the process advances to step S1202.

In step S1202, the Web server unit 502 generates reply data in which the default priority order is set, and the process advances to step S1007.

In step S1203, the Web server unit 502 executes the following processing based on the content information managed by the content information management unit 507 and the client information acquired in step S1002. The Web server unit 502 determines whether or not the priority order of objects set in reply data needs to be changed from the default value (step S1203). When the priority order of objects set in reply data does not need to be changed from the default value, the process advances to step S1006. When the priority order of objects set in reply data needs to be changed from the default value, the process advances to step S1204.

Then, the Web server unit 502 determines the priority order of objects to be set to reply data based on content information and client information (step S1204), and the process advances to step S1006.

The present embodiment is preferably used in, for example, a Web mail system. Assume the case where a mail list is displayed on the server computer 102 from the web browser of the client computer 103. The server computer 102 acquires a round trip time (RTT) from the server computer 102 to the client computer 103.

Furthermore, the server computer 102 analyzes objects included in the content based on content information to thereby determine a large-size object such as an unread mail, an attached file, or the like as an object corresponding to a low-priority stream.

When the server computer 102 determines that a communication environment between the server computer 102 and the client computer 103 is a low speed environment in which the communication speed is equal to or less than a certain threshold value based on the acquired RTT, the server computer 102 executes the following processing. The server computer 102 designates the number of counts to be pre-read for restricting the number of unread mails and large-size files depending on the value of RTT.

For example, when the RTT is 3 seconds, that is, in the case of a low-speed communication environment, the server computer 102 designates the number of counts for pre-reading the unread mail main bodies as "3". Here, when the first unread mail out of the three unread mails in high priority order has a size greater than a threshold value, the server computer 102 designates the first unread mail using link rel="prefetch" in HTML. The server computer 102 designates the second and third unread mails for pre-reading using link rel="next" in HTML. In this manner, the server computer 102 can instruct the client computer 103 to pre-read the first unread mail after pre-reading the second and third unread mails.

For example, when the RTT is 100 milliseconds, that is, in the case of a high-speed communication environment, the server computer 102 designates the number of counts for pre-reading the unread mail main bodies as "10". Furthermore, the server computer 102 designates the number of counts for pre-reading the unread mail main bodies as "10" using link rel="next" in HTML. In this manner, the server computer 102 instructs the client computer 103 to pre-read ten unread mail main bodies including a large-size object.

For a mail list which is a main body (<Body>), the client computer 103 designates the priority order "4" to a stream corresponding thereto. For the unread mail main body designated by link rel="next", the client computer 103 designates the low priority order "5" to a stream corresponding thereto. Also, for the unread mail main body designated by rel="prefetch", the client computer 103 designates the priority order "5" to a stream corresponding thereto. In this manner, after acquisition of a mail list which is a main body by foreground processing, the client computer 103 can acquire the unread mail main body by background processing and cache it in a cache memory.

According to the third embodiment, the server computer 102 can set the optimum priority of streams for each data based on the attributes of objects and the state of network environment between the server computer 102 and the client computer 103. Thus, appropriate data transfer is performed by appropriate foreground processing, resulting in an improvement in data display speed.

As described above, while a detailed description has been given of the preferred embodiments of the present invention, the present invention may also be applied to a system consisting of a plurality of devices.

The present invention may also be applied to a device consisting of integrated equipment including the case where a device is configured by a virtual OS or the like. Furthermore, the present invention may be applicable to a system in which an information processing device is constituted by a cloud computing via Internet.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-159904 filed on Jul. 18, 2012, which is hereby incorporated by reference herein in its entirety.

The invention claimed is:

1. An information processing device serving as a client computer, which is capable of communicating with a server via a network, wherein the server provides data that includes designations related to a plurality of contents and server side priority information, the information processing device comprising:
  at least one memory storing instructions related to a web browser, and
  at least one processor executing the instructions causing the information processing device to:
    receive data provided from the server to the client computer via the network, wherein the provided data includes, as the server side priority information, information capable of specifying whether importance of content is high or low;
    assign, by the web browser, a value of an individual priority based on the importance specified by the server side priority information for at least one stream among streams that are included in a session managed on a single TCP connection with the server;
    acquire contents from the server by using the at least one stream for which the value of the individual priority has been assigned; and
    control display using a part of the contents from among the acquired contents.

2. The information processing device according to claim 1, wherein the attribute of each of the contents includes type information.

3. The information processing device according to claim 1, wherein the instructions further cause the information processing device to cache other contents from among the acquired contents.

4. The information processing device according to claim 1, wherein a number of the streams which are capable of being simultaneously used for acquiring contents on the single TCP connection with the server is limited by the server according to environment information about the information processing device.

5. The information processing device according to claim 1, wherein the priorities are selectively determined from among a plurality of parameters, based on the priority information included in the data provided from the server.

6. The information processing device according to claim 1, wherein the at least one stream for which the individual priority is assigned is further assigned a value indicating a dependency relationship with another stream based on the importance.

7. A method for an information processing device serving as a client computer, which has at least one memory storing instructions related to a web browser and which is capable of communicating with a server via a network, wherein the server provides data that includes designations related to a plurality of contents and server side priority information, the method comprising:
  receiving data provided from the server to the client computer via the network, wherein the provided data includes, as the server side priority information, information capable of specifying whether importance of content is high or low;
  assigning, by the web browser, a value of an individual priority based on the importance specified by the server side priority information for at least one stream among streams that are included in a session managed on a single TCP connection with the server;
  acquiring contents from the server by using the at least one stream for which the value of the individual priority has been assigned; and
  controlling display using a part of the contents from among the acquired contents.

8. A non-transitory storage medium on which is stored a computer program for making a computer execute a method executed in an information processing device serving as a client computer, which has at least one memory storing instructions related to a web browser and which is capable of communicating with a server via a network, wherein the server provides data that includes designations related to a plurality of contents and server side priority information, the method comprising:

receiving data provided from the server to the client computer via the network, wherein the provided data includes, as the server side priority information, information capable of specifying whether importance of content is high or low;

assigning, by the web browser, a value of an individual priority based on the importance specified by the server side priority information for at least one stream among streams that are included in a session managed on a single TCP connection with the server;

acquiring contents from the server by using the at least one stream for which the value of the individual priority has been assigned; and controlling display using a part of the contents from among the acquired contents.

9. An information processing device serving as a client computer, which is capable of communicating with a server via a network, wherein the server provides data that includes designations related to a plurality of contents and server side priority information, the information processing device comprising:

at least one memory storing instructions related to a web browser, and at least one processor that, upon executing the instructions, causes the information processing device to:

receive data provided from the server to the client computer via the network, wherein the provided data includes, as the server side priority information, information capable of specifying whether importance of content is high or low, and assign, by the web browser, a value of an individual priority for at least one stream among streams that are included in a session managed on a single TCP connection with the server, wherein the assigned value is a value based on the importance specified by the server side priority information, and wherein the content is transmitted from the server by using the at least one stream for which the value of the individual priority has been assigned.

10. A method for an information processing device serving as a client computer, which has at least one memory storing instructions related to a web browser and which is capable of communicating with a server via a network, wherein the server provides data that includes designations related to a plurality of contents and server side priority information, the method comprising:

receiving data provided from the server to the client computer via the network, wherein the provided data includes, as the server side priority information, information capable of specifying whether importance of content is high or low, and assigning, by the web browser, a value of an individual priority for at least one stream among streams that are included in a session managed on a single TCP connection with the server, wherein the assigned value is a value based on the importance specified by the server side priority information, and wherein the content is transmitted from the server by using the at least one stream for which the value of the individual priority has been assigned.

11. A non-transitory storage medium on which is stored a computer program for making a computer execute a method executed in an information processing device serving as a client computer, which has at least one memory storing instructions related to a web browser and which is capable of communicating with a server via a network, wherein the server provides data that includes designations related to a plurality of contents and server side priority information, the method comprising:

receiving data provided from the server to the client computer via the network, wherein the provided data includes, as the server side priority information, information capable of specifying whether importance of content is high or low, and assigning, by the web browser, a value of an individual priority for at least one stream among streams that are included in a session managed on a single TCP connection with the server, wherein the assigned value is a value based on the importance specified by the server side priority information, and wherein the content is transmitted from the server by using the at least one stream for which the value of the individual priority has been assigned.

* * * * *